United States Patent
Chang

(10) Patent No.: US 11,428,966 B2
(45) Date of Patent: Aug. 30, 2022

(54) SYSTEMS AND METHODS FOR ADAPTING DISPLAY BRIGHTNESS TO MATCH PRIVACY FILTER USAGE

(71) Applicant: DELL PRODUCTS L.P., Round Rock, TX (US)

(72) Inventor: Chen-Hsin Chang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/916,970

(22) Filed: Jun. 30, 2020

(65) Prior Publication Data
US 2021/0405404 A1 Dec. 30, 2021

(51) Int. Cl.
G09G 5/10 (2006.01)
G02F 1/13 (2006.01)
G02F 1/13357 (2006.01)
G09G 3/34 (2006.01)

(52) U.S. Cl.
CPC ...... *G02F 1/1323* (2013.01); *G02F 1/133611* (2013.01); *G09G 3/342* (2013.01); *G09G 5/10* (2013.01)

(58) Field of Classification Search
CPC . G02F 1/1323; G02F 1/133611; G09G 3/342; G09G 3/3648
USPC .......................................................... 345/89
See application file for complete search history.

(56) References Cited

U.S. PATENT DOCUMENTS

| 9,372,521 | B2 | 6/2016 | Sultenfuss et al. |
| 9,558,527 | B2 | 1/2017 | Sierra et al. |
| 2006/0109224 | A1* | 5/2006 | Chang ................ G09G 3/3648 345/89 |
| 2017/0263208 | A1* | 9/2017 | Imai ....................... G09G 3/342 |
| 2021/0063783 | A1* | 3/2021 | Byoun ............. G02F 1/133611 |

OTHER PUBLICATIONS

"Dell New Latitude Laptops Try to Foil Prying Eyes", PC Magazine, Captured from Internet Apr. 30, 2019, 4 pgs.
"Dell Latitude 7400", PC Magazine, Captured from Internet Dec. 14, 2019, 9 pgs.
HP, "HP Sure View", Technical White Paper, Nov. 2016, 5 pgs.
"HP EliteBook X360 1020 G2 Review", PC Magazine, Captured from Internet Jan. 18, 2018, 6 pgs.
Guerra, "Systems and Methods for Providing Universal Support for Multiple Types of Graphics Processing Units", U.S. Appl. No. 16/687,232, filed Nov. 18, 2019, 35 pgs.

* cited by examiner

*Primary Examiner* — Abdul-Samad A Adediran
(74) *Attorney, Agent, or Firm* — Egan, Enders & Huston LLP

(57) ABSTRACT

Systems and methods are provided that may be implemented to increase display panel brightness consistency when using an electronically-activated privacy filter of an information handling system to switch back and forth between a private viewing mode and a non-private viewing mode. The provided systems and methods may automatically vary the brightness intensity of currently-active display panel backlight/s without user control so as to compensate for changes in the display panel brightness that would otherwise occur due to changes in the number of active backlights caused by switching between private viewing mode and non-private viewing mode.

22 Claims, 5 Drawing Sheets

SYSTEMS AND METHODS FOR ADAPTING DISPLAY BRIGHTNESS TO MATCH PRIVACY FILTER USAGE

FIELD OF THE INVENTION

This application relates to information handling systems and, more particularly, to displays for information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Privacy is considered important when a user views content having security or privacy concerns on a LCD display panel of an information handling system, such as a laptop or smartphone. The viewing cone of a system display panel determines whether or not displayed images may be observed by other persons who are positioned closely to either side of the user of the information handling system, such as when the system user is sitting next to another person on an aircraft, train or under other dense seating conditions.

An electronically-activated privacy filter has been developed for information handling systems to reduce the angle of a viewing cone of a liquid crystal display (LCD) display panel when private viewing is desired by the user, e.g., so that images displayed on the display panel are only viewable from a user position directly in front of the center axis of display panel when the user so desires. Such an electronically-activated privacy filter employs a privacy filter film that is positioned between multiple backlights and the LCD display panel. The privacy filter film redirects light from a first side of the film onto the display panel in one or more directions that are dictated by the direction or directions of light as they are shined at any given time onto a second side of the privacy filter film from one or more of the backlights. This allows the width of the viewing cone of the display panel to be electronically controlled by a user by entering a function key command to select whether only one or all of the backlights are turned on at any given time.

During normal (non-private) viewing mode, all backlights of the display panel are activated to shine light onto the privacy filter film from multiple different directions. The privacy filter film redirects this light received from multiple directions so as to disperse it to all parts of the LCD display panel so as to produce a wide viewing cone for images displayed to the system user by the display panel. Images displayed by the wide viewing cone in normal (non-private) viewing mode are visible from all viewing angles, including by non-users who are positioned next to the system user, such as by other passengers sitting next to the system user in an aircraft cabin.

However, when the system user enters a designated keyboard command to select private viewing mode, only a designated single one of the multiple backlights is activated to shine light onto the privacy filter film from a single direction onto the privacy filter film while all other backlights are turned off (not activated). The privacy filter film is in turn configured to redirect this single-direction light received from the designated single backlight to only the center of the LCD display panel so as to produce a narrowed viewing cone angle for images displayed to the system user. Images displayed by the narrowed viewing cone are visible from a system user positioned directly in front of the center axis of display panel, but are impossible or difficult to see from viewing angles corresponding to non-users who positioned next to the system user but who are not positioned directly in front of the center axis of display panel. When desired, the system user may return the system to normal (non-private) viewing mode by entering another designated keyboard command. The user-entered keyboard commands to enable or disable the privacy filter are provided as respective keyboard scan codes from the system keyboard microcontroller to an embedded controller of the information handling system, which responds by providing a corresponding general purpose input/output (GPIO) signal to an integrated timing controller (TCON) of the display panel to either cause the TCON to either activate all the backlights (to enable normal viewing mode) or to activate only the designated single backlight (to enable private viewing mode).

Since an electronically-activated privacy filter narrows the viewing cone for private viewing mode resulting in reducing the amount of currently active backlights, the display panel brightness abruptly decreases when entering private viewing mode from non-private viewing mode. When returning to non-private viewing mode, the electronically-activated privacy filter is off, which causes the display panel brightness to abruptly increase. A user will typically experience a difference in display panel brightness of between 10 nits to 50 nits as measured at the surface of the display panel when switching between non-private mode and private mode. These sudden brightness changes break the continuity of the viewing experience and are often uncomfortable for a system user. To compensate, the system user must manually increase the backlight brightness intensity by using a designated function key of the information handling system to compensate for the reduced display panel brightness during private viewing mode, and must manually decrease the backlight intensity using a designated function key to compensate for the increased display panel brightness upon return to non-private viewing mode.

SUMMARY OF THE INVENTION

Systems and methods are disclosed herein that may be implemented to increase display panel brightness consistency when using an electronically-activated privacy filter of an information handling system to switch back and forth between a private viewing mode and a non-private viewing mode. The disclosed systems and methods may automatically vary the brightness intensity of currently-active display panel backlight/s without user control so as to compensate for changes in the display panel brightness that would otherwise occur due to changes in the number of active backlights caused by switching between private viewing mode and non-private viewing mode. The disclosed systems and methods may be advantageously implemented to increase display panel brightness consistency with any type of display panel privacy filter technology that causes display panel brightness to vary (e.g., decrease) from normal viewing mode brightness when a privacy mode is implemented.

In one exemplary embodiment, the disclosed system and methods may automatically vary duty cycle of a Pulse Width Modulation (PWM) control signal without any user brightness control input to change the brightness intensity of the currently-active display panel backlight/s so that the brightness intensity of the display panel remains uniform despite changing between private viewing mode and non-private viewing mode. In one embodiment, the disclosed systems and methods may be advantageously implemented using a firmware and/or software-based control mechanism that varies the brightness intensity of currently-active display panel backlight/s so as to compensate for changes in the display panel brightness.

In one respect, disclosed herein is a method, including using at least one programmable integrated circuit of an information handling system to: control one or more backlights of the information handling system to alternately illuminate a display panel of the information handling system in a first mode to display images to a user at a first viewing angle and to illuminate the display panel in a second mode to display images to the user at a second viewing angle, the first viewing angle being wider than the second viewing angle; and automatically vary a brightness intensity of one or more of the backlights of the information handling system in response to changes between the first mode and the second mode by illuminating the display panel of the information handling system with a first backlight brightness intensity whenever the one or more backlights are operated in the first mode, and by illuminating the display panel of the information handling system with a second backlight brightness intensity whenever the one or more backlights are operated in the second mode, the second backlight brightness intensity being greater than the first backlight brightness intensity.

In another respect, disclosed herein is an information handling system, including: a display panel producing images based on display data; one or more backlights illuminating the display panel to display the produced images on a front side of the display panel; and at least one programmable integrated circuit coupled to the display panel and the one or more backlights, the at least one programmable integrated circuit being programmed to: provide the display data to the display panel; control the one or more backlights to alternately illuminate the display panel of the information handling system in a first mode to display the images to a user at a first viewing angle and to illuminate the display panel in a second mode to display images to the user at a second viewing angle, the first viewing angle being wider than the second viewing angle; and control the one or more backlights to automatically vary a brightness intensity of one or more of the backlights of the information handling system in response to changes between the first mode and the second mode by illuminating the display panel of the information handling system with a first backlight brightness intensity whenever the one or more backlights are operated in the first mode, and by illuminating the display panel of the information handling system with a second backlight brightness intensity whenever the one or more backlights are operated in the second mode, the second backlight brightness intensity being greater than the first backlight brightness intensity.

DESCRIPTION OF ILLUSTRATIVE EMBODIMENTS

Figure 1A:
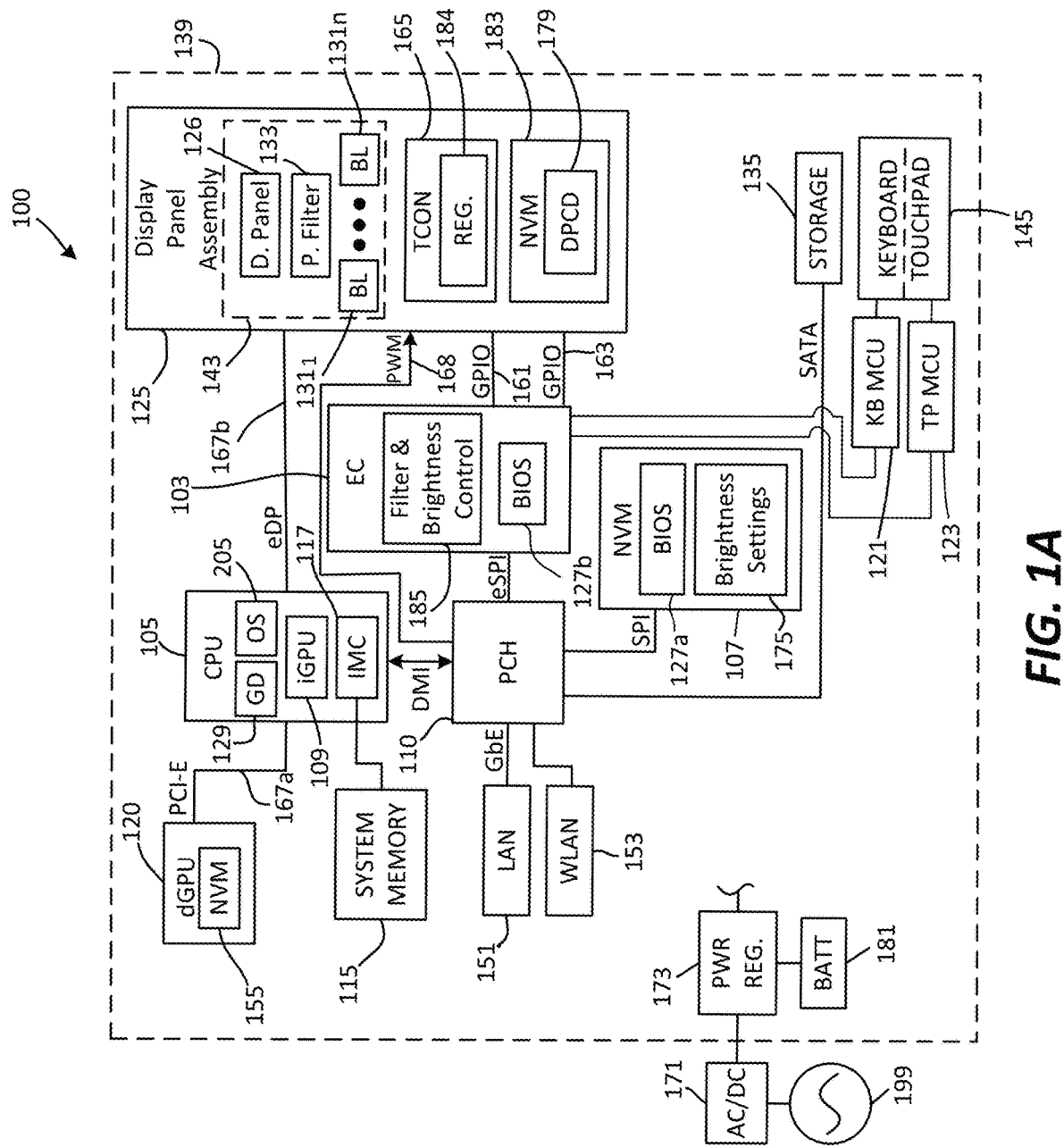
FIG. 1A illustrates a block diagram of an information handling system according to one exemplary embodiment of the disclosed systems and methods.

FIG. 1A is a block diagram of an information handling system 100 as it may be configured according to one exemplary embodiment of the disclosed systems and methods. Information handling system 100 may be, for example, a mobile information handling system such as a notebook computer, laptop computer, tablet computer or smartphone having a chassis enclosure 139 delineated by the outer dashed outline in FIG. 1A. As shown in FIG. 1A, information handling system 100 of this exemplary embodiment includes various components contained within the chassis enclosure 139 which may be, for example, a plastic and/or metal case (e.g., notebook or laptop computer case, tablet computer case, smartphone case, etc.).

Still referring to FIG. 1A, information handling system includes a host processing device 105 which may be a central processing unit CPU such as an Intel processor, Advanced Micro Devices (AMD) processor, or one of many other suitable processing devices currently available. In this embodiment, a host processing device in the form of CPU 105 may execute a host operating system (OS) 205 for system 100. System memory may include main system memory 115 (e.g., volatile random access memory such as DRAM or other suitable form of random access memory) coupled (e.g., via DDR channel) to an integrated memory controller (iMC) 117 of CPU 105 to facilitate memory functions, although it will be understood that a memory controller may be alternatively provided as a separate chip or other circuit in other embodiments.

As shown in FIG. 1A, CPU 105 itself includes an integrated GPU (iGPU) 109 and information handling system 100 also includes a separate internal discrete GPU (dGPU) 120 that may be powered by a power source of information handling system (e.g., such as AC adapter 171 and/or internal smart battery pack 181) using internal integrated power supply circuitry and/or internal voltage regulation circuitry 173 of information handling system 100. In one optional mode of operation, video content from CPU 105 may be sourced at any given time either by iGPU 109 or dGPU 120, and may be switchable "on the fly" from one to the other using drivers of a switchable graphics software utility (e.g., NVidia Optimus available from NVidia of Santa Clara, Calif.; AMD Power Express available from Advanced Micro Devices Inc. of Sunnyvale, Calif.) that may be optionally executing on CPU 105 and that is typically provided by a supplier of the given dGPU 120 that is presently installed in information handling system 100.

As shown in FIG. 1A, dGPU 120 of FIG. 1A may be, for example, a graphics card that is coupled to CPU 105 of information handling system 100 by a peripheral component interconnect express (PCI-E) bus 167a, and CPU 105 with its iGPU 109 is in turn coupled to internal display panel assembly 125 and its planar LCD display panel 126 by eDP bus 167b. Planar display panel 126 is configured to produce images based on display data generated by iGPU 109 and/or dGPU 120 and received through eDP 167b. These images produced by display panel 126 are in turn illuminated for display on a front side of display panel 126 to a user positioned in front of display panel 126 by two or more backlights (e.g., light emitting diode "LED" backlights) $131_1$ to $131_N$ that are positioned to shine light on a backside of display panel 126 so that the light passes through display panel 126 and illuminates the images to the user. Examples of different dGPU manufactures and suppliers include, but are not limited to, Nvidia, AMD, etc. Examples of different types of dGPUs include, but are not limited to, Nvidia Quadro, Nvida Geforce, AMD Radeon, AMD RX, etc.

It will be understood that eDP is just one example of a suitable type of data bus interface that may be employed to route graphics data between internal components of information handling system 100, and that any other suitable type of data bus/es may be employed. Other examples of possible dGPU and iGPU configurations and system architectures may be found described and illustrated in U.S. Pat. No. 9,558,527, which is incorporated herein by reference in its entirety for all purposes.

As further illustrated in FIG. 1A, CPU 105 may be coupled to platform controller hub (PCH) 110 (e.g., by direct media interface "DMI") which may be present to facilitate input/output functions for the CPU 105 with various internal components of information handling system 100. In this exemplary embodiment, PCH 110 is shown coupled to other components that include system embedded controller (EC) 103 (e.g., coupled via enhanced serial peripheral interface "eSPI"), non-volatile memory 107 (e.g., SPI Flash memory device), wireless network card (WLAN) 153 for Wi-Fi or other wireless network communication, integrated network interface card (LAN) 151 for Ethernet or other wired network connection, touchpad microcontroller (MCU) 123, and keyboard microcontroller (MCU) 121. Also shown coupled to PCH 110 are other components of information handling system 100 which include display panel assembly 125, user interface devices in the form of keyboard and touchpad 145 (coupled to EC 103 via respective keyboard and touchpad MCUs 121 and 123), and local system storage 135, e.g., hard drive or other suitable type of permanent storage media such as solid state drive (SSD), optical drives, NVRAM, Flash or any other suitable form of internal storage. Persistent storage (e.g., non-volatile memory 107) may be accessed as needed by EC 103 and/or CPU 105. Such persistent storage 107 may store or contain firmware or other programming that may be used by EC 103, such as system BIOS code and BIOS settings 127a, and brightness settings 175 for normal and private viewing modes described further herein.

As further shown in FIG. 1A, a display panel assembly 125 includes an integrated timing controller (TCON) 165 that is a programmable integrated circuit (e.g., such as microcontroller) that is programmed to receive image data from iGPU 109 and/or dGPU 120, convert the format for input to source drivers of display panel 126 and generate controlling signals for gate and source drivers of display panel 126. In this embodiment, display panel assembly 125 also includes integrated non-volatile memory (NVM) 183 which is present for storing information such as programming, system variables and multiple different DPCD register values 179 for use by TCON 165 during system operation. Also shown are TCON DPCD registers 184 into which DPCD register values 179 are loaded to control how brightness control and color processing is performed by TCON 165.

Also shown in FIG. 1A are GPIO conductors 161 and 163 that are coupled to communicate GPIO signals from a programmable integrated circuit (e.g., such as EC 103) to integrated TCON 165 of display panel assembly 125. TCON 165 is also programmed to receive and respond to GPIO signals 161 and 163 from EC 103 to selectably enable (i.e., turn on) either the first backlight $131_1$ or all backlights $131_1$ to $131_N$ to produce light at any given time. TCON 165 is also programmed to control brightness of the currently-enabled backlights $131_1$ to $131_N$ based on the duty cycle of Pulse Width Modulation (PWM) control signals 168 received from graphics driver 129 executing on CPU 105, or alternatively from dGPU 120. As described further herein, graphics driver 129 on CPU 105 may set the duty cycle of the PWM control signals at any given time based on control data received as Advanced Configuration and Power Interface (ACPI) ASL code from EC 103 via eSPI and PCH 110.

As further shown in FIG. 1A, a planar privacy filter film 133 is positioned between backlights $131_1$ to $131_N$ and a planar display panel 126 to form a display panel subassembly 143, i.e., with the planar privacy filter film 133 aligned with, and oriented parallel to, the planar display panel 126. In this embodiment, backlights $131_1$ to $131_N$ are present to illuminate LCD display panel 126 through privacy filter film 133. Each of multiple backlights $131_1$ to $131_N$ selectably produce light rays that are emitted to shine on privacy filter film 133 from a different direction direction. For example, in one embodiment a first backlight $131_1$ may focus light onto privacy filter film 133 from a single direction relative to the plane of privacy filter film 133, which is configured in turn to redirect this light of this particular single direction only toward the center of display panel 126. Additional backlights $131_2$ to $131_N$ may be controlled by the user to selectably shine light onto privacy filter film 133 from multiple other directions relative to the plane of privacy filter film 133, which is configured in turn to redirect the light received from all backlights $131_1$ to $131_N$ when active so that it is dispersed across all areas of display panel 126. As described further herein, the additional backlights $131_2$ to $131_N$ may be turned on and off electronically by the user to selectably implement a privacy filter by varying the identity of backlights $131_1$ to $131_N$ that are active or turned on at any given time to direct light onto privacy filter film 133 to illuminate display panel 126 for the system user.

Figure 1B:
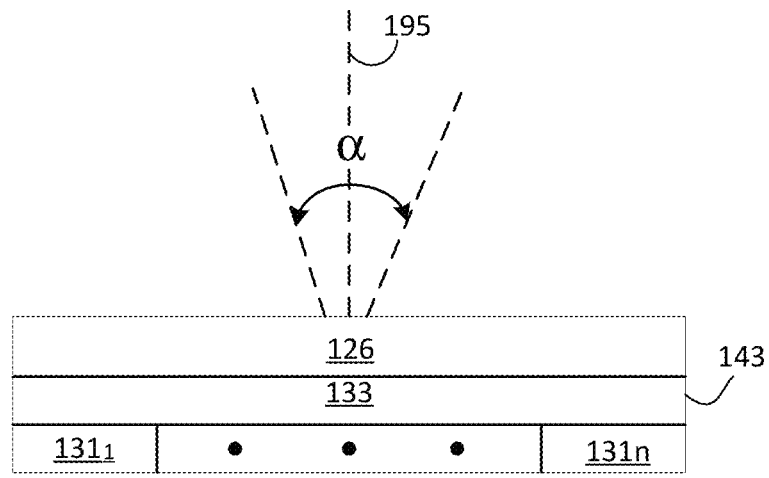
FIG. 1B illustrates display of a narrowed viewing cone to a user during a private viewing mode according to one exemplary embodiment of the disclosed systems and methods.
Figure 1C:
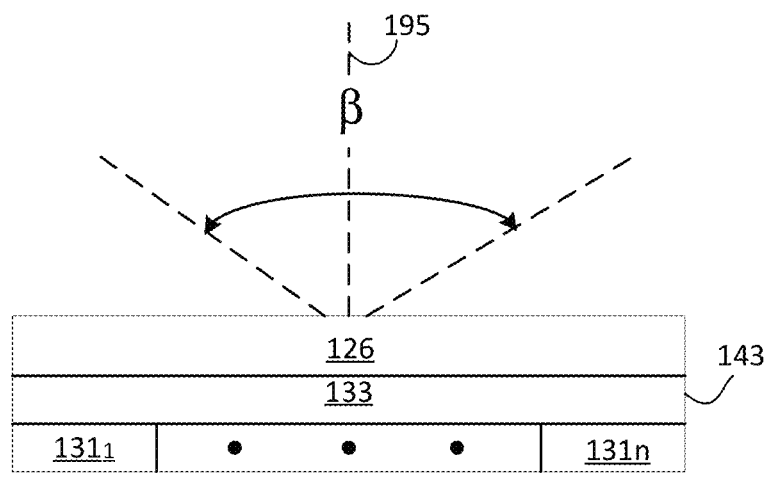
FIG. 1C illustrates display of a widened viewing cone to a user during a normal (non-private) viewing mode according to one exemplary embodiment of the disclosed systems and methods.

In the above embodiment, a user may press a designated function key (or other designated key) on keyboard 145 to enter a first keyboard command via keyboard microcontroller 121 to activate a private viewing mode in which only first backlight $131_1$ is activated to produce light directed toward the center of the display panel 126, while other backlights $131_2$ to $131_N$ are not active and produce no light. The keyboard microcontroller 121 may provide the first keyboard command as a first keyboard scan code to EC 103 where filter and brightness control logic 185 executing on EC 103 responds to the first keyboard scan code by providing a state of GPIO control signal 161 that instructs TCON 165 to turn on backlight $131_1$, and by providing a state of GPIO control signal 163 that instructs TCON 165 to turn off all other backlight backlights $131_2$ to $131_N$ In this private viewing mode the resulting narrowed viewing cone 191 (shown in FIG. 1B) for the images displayed to the system user has a narrower viewing angle α that is less than a wider viewing angle β of a wider viewing cone 193 (shown in FIG. 1C) for the displayed during normal (non-private viewing mode). It will be understood that in other embodiments, a user may enter designated first commands via other types of user interface devices, such as using a designated first mouse click entry or a designated first touchpad entry via touchpad microcontroller 123 to activate a private viewing mode instead of the designated first keyboard command described above.

For example, a narrower private viewing mode angle may in one embodiment be defined as a narrower viewing cone angle α from 60 to 70 degrees that is centered about a center axis line 195 extending outward from the display panel 126 in a direction perpendicular to the plane of the display panel 126, although a narrower private viewing mode angle α may be any other greater or lesser viewing angle that is narrower than the corresponding wider normal viewing angle (e.g., such as a wider viewing cone angle β from 160 to 180 degrees that is centered about a center axis line 195 extending outward from the display pane 126 in a direction perpendicular to the plane of the display panel 126 or any other viewing angle wider than the narrower viewing angle), and that is configured as desired for a given system configuration instantiation. Images so displayed by the narrowed viewing cone of the private viewing mode are fully visible from a user position directly in front of the center axis line 195 of display panel 126, but difficult or impossible to see from viewing positions that are not so aligned with the center axis line 195 of display panel 126, e.g., not visible from viewing positions corresponding to persons other than the system user who are positioned beside the system user such as other passengers sitting by the system user in an aircraft cabin.

While in private viewing mode, the system user may press a designated function key (or other designated key) on keyboard 145 to enter a second keyboard command via keyboard microcontroller 121 to return to normal (non-private) viewing mode in which all backlights $131_1$ to $131_N$ are active and produce light that is dispersed across the full display panel area. The keyboard 145 may provide the second keyboard command as a second keyboard scan code to EC 103 where filter and brightness control logic 165 responds to the second keyboard scan code by providing a state of GPIO control signal 161 that instructs TCON 165 to turn on backlight $131_1$, and by providing a state of GPIO control signal 163 that instructs TCON 165 to turn on all other backlights $131_2$ to $131_N$ In normal viewing mode, the resulting wider viewing cone for the images displayed to the system user has a wider viewing angle, e.g., viewing angle 160 to 180 degrees or other viewing angle that is greater than the narrower viewing angle of the private viewing mode as configured for a given system configuration. Images so displayed by the widened viewing cone of normal viewing mode are fully visible from positions that are outside the center axis of display panel 126, e.g., visible by viewing positions corresponding to persons other than the system user who are positioned beside the system user such as other passengers sitting by the system user in an aircraft cabin. It will be understood that in other embodiments, a user may alternatively enter other types of designated second commands via other types of user interface devices, such as using a designated second mouse click entry or a designated second touchpad entry via touchpad microcontroller 123 to activate a normal (non-private) viewing mode instead of the designated second keyboard command described above.

The embodiment of FIG. 1A includes a keyboard 145 as an input/output (I/O) device for accepting user input and is implemented employing user-entered keyboard commands to enable and disable private viewing modes. However, it will be understood that in other embodiments, other types of user commands may be entered via other types of I/O devices to enable or disable private viewing modes, e.g., such as touchscreen commands entered on a touchscreen of an information handling system such as smartphone or tablet computer.

In one embodiment, information handling system 100 may be a mobile battery-powered information handling system that may be selectively coupled to an external source of system (DC) power, for example AC mains 199 and an AC adapter 171. Information handling system 100 may also include an internal DC power source (e.g., smart battery pack) that is configured to provide system power source for the system load of information handling system, e.g., when an external source of system power is not available or not desirable. Further information on battery-powered information handling system architecture and components may be found in U.S. Pat. No. 9,372,521, and in U.S. patent application Ser. No. 16/687,232 filed Nov. 18, 2019, each of which is incorporated herein by reference in its entirety. It will also be understood that the particular configuration of FIG. 1A is exemplary only, and that an information handling system may be configured with fewer, additional or alternative components than those illustrated in FIG. 1A.

In other embodiments, the disclosed systems and methods may be similarly implemented using other types of information handling systems including, but not limited to, non-battery powered information handling systems that are coupled in signal communication with separate external display monitor having display panel assembly and/or external I/O devices (e.g., keyboard, mouse, etc.) such as desktop or tower computers, all-in-one computers having internal integrated display panel assemblies, etc. In such embodiments, the external or internal display panel assemblies may include a display panel sub-assembly 143 that is similarly configured as described in relation to FIG. 1A with a privacy filter film 133 positioned between a display panel 126 and multiple backlights $131_1$ to $131_N$. One or more programmable integrated circuits of these other types of information handling systems (e.g., CPU, GPU, embedded controller, display panel assembly TCON, etc.) may be programmed to execute logic similar to that described hereinabove in relation to FIG. 1A hereinbelow in relation to FIG. 2.

For example, in one exemplary embodiment filter and brightness control logic 185 may be implemented partially or entirely by a programmable integrated circuit (e.g., such as TCON) that is integrated within the display assembly 125 itself, e.g., logic executing on the TCON may respond to changes in the number of active backlights $131_1$ to $131_N$ by automatically adjusting the brightness intensity of currently-active display panel backlight/s according to brightness settings disclosed herein so as to compensate for changes in the display panel brightness when transitioning back and forth between a normal (non-private) viewing mode and a private viewing mode without requiring EC 103 to control graphics driver 129 to provide a compensated PWM signal 168 via PCH 110. The disclosed systems and methods may also be implemented in other embodiments with information handling systems having other types of display panel privacy filter technology that causes display panel brightness to vary (e.g., decrease) from normal viewing mode brightness when a privacy mode is implemented.

It is also possible in one embodiment that a single multi-mode backlight may be controlled to selectably implement both normal (non-private) and private viewing modes. For example, a single multi-mode backlight may be controlled to operate in a first mode to implement a private viewing mode by focusing light onto privacy filter film 133 from a single direction relative to the plane of privacy filter film 133, which in turn redirects this light of this particular single direction only toward the center of display panel 126. The same single multi-mode backlight may be controlled to operate in a second mode to implement a normal (non-private) viewing mode by shining light onto privacy filter film 133 from multiple directions (in addition to the single direction of the private mode) relative to the plane of privacy filter film 133, which in turn redirects the light received from the multiple directions so that it is dispersed across all areas of display panel 126.

Figure 2:
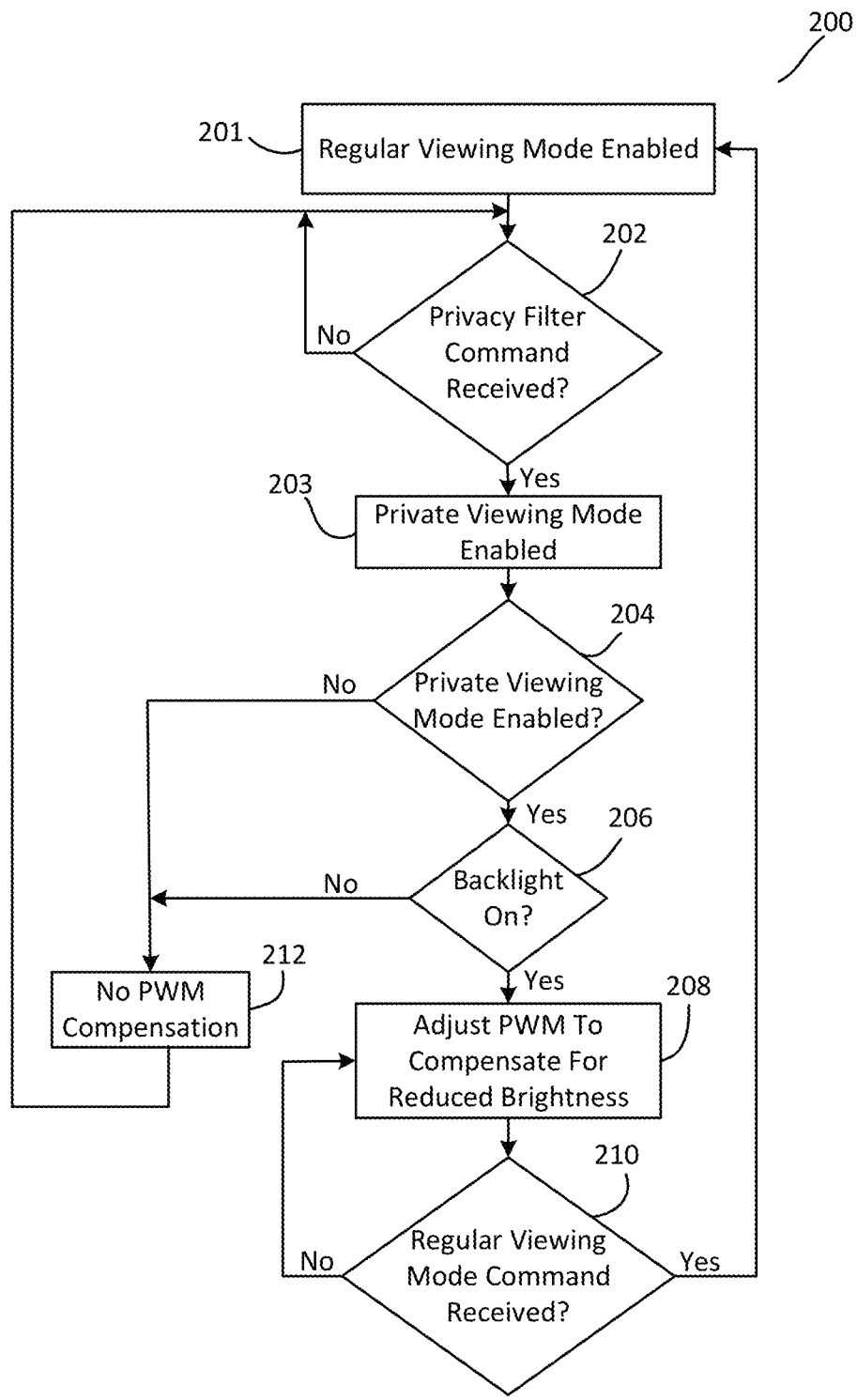
FIG. 2 illustrates methodology according to one exemplary embodiment of the disclosed systems and methods.

FIG. 2 illustrates methodology 200 that may be implemented with the system of FIG. 1A according to one exemplary embodiment by filter and brightness control logic 185 executing on EC 103. As shown, methodology 200 begins in step 201 at which point display panel assembly 125 is operated under the control of EC 103 to enable a normal (non-private) viewing mode with all backlights $131_1$ to $131_N$ active and illuminated at a first brightness level which may be previously set by a system user, e.g., by press of appropriate designated brightness key/s on keyboard 145 and transmitted via keyboard MCU 121 to EC 103. EC 103 may determine a normal PWM duty cycle setting corresponding to the first brightness level from brightness settings 175 on NVM 107 (e.g., as described further herein relative to Table 1 and FIG. 3), and transmit control data corresponding to this determined normal PWM duty cycle setting as Advanced Configuration and Power Interface (ACPI) ASL code through eSPI interface and PCH 110 to CPU 105. Graphics driver 129 on CPU 105 may respond to this received control data by transmitting a PWM signal 168 having a first duty cycle magnitude to TCON 165 to cause the backlights $131_1$ to $131_N$ to be illuminated at the first brightness level (e.g., based on manual user selection), and EC 103 transmits GPIO signals 161 and 163 to cause all backlights $131_1$ to $131_N$ to be active and illuminated at the first brightness level set by the normal PWM duty cycle setting so provided from CPU 105.

In step 202, it is determined whether a privacy filter command has been received, e.g., from a user pressing designated private viewing mode key/s on keyboard 145. If no privacy filter command has been received, system 100 continues operating in normal (non-private) viewing mode with display panel 126 illuminated at the first brightness level, in which case CPU 105 continues transmitting the first PWM duty cycle setting as signal 168 and EC 103 continues transmitting the same GPIO signals 161 and 163 to cause all backlights $131_1$ to $131_N$ to be active and illuminated. Step 202 then iteratively repeats as shown until a privacy filter command is received.

When it is determined in step 202 that a privacy filter command has been received (e.g., by user press of designated private viewing key/s of keyboard 145), then methodology 200 proceeds to step 203 where EC 103 transmits GPIO signals 161 and 163 to TCON 165 of display panel assembly 125 to enable the private viewing mode by causing TCON 165 to deactivate backlights $131_2$ to $131_N$ and to leave only backlight $131_1$ active and illuminated.

Next in step 204, it is confirmed that private viewing mode has been successfully enabled. If not (e.g., such as in the case where multiple backlights $131_1$ to $131_N$ remain active and illuminated), then methodology 200 proceeds to step 212 where CPU 105 continues transmitting the first PWM duty cycle setting to TCON 165, and methodology 200 repeats as shown. However, if it is determined in step 204 that private viewing mode has been successfully enabled, then methodology 200 proceeds to step 206.

In step 206, it is determined whether backlight $131_1$ is currently active and illuminated. If not (e.g., such as in the case where information handling system 100 is currently in sleep mode with all panel backlights $131_1$ to $131_N$ inactive and not illuminated, information handling system 100 is currently in idle mode with all panel backlights $131_1$ to $131_N$ inactive and not illuminated, etc.), then methodology 200 proceeds to step 212 and then repeats as described above. However, if it is determined in step 206 that backlight $131_N$ is currently active and illuminated, then methodology 200 proceeds to step 208.

In step 208, filter brightness and control logic 185 executes on EC 103 to access predefined PWM compensation data maintained as part of brightness settings 175 stored on NVM 107. Brightness settings 175 may be provided in the form of any suitable relationship between given brightness level settings and normal and compensated PWM duty cycle settings corresponding to each given brightness level setting as shown in Table 1 below.

In the example embodiment of Table 1, brightness level settings are expressed in units of nits as measured at the surface of the display panel 126, and each of normal PWM settings and compensated PWM duty cycle settings are expressed as a PWM duty cycle value (e.g., duty cycle percentage) for backlights $131_1$ to $131_N$. However, it will be understood that brightness level settings and/or PWM duty cycle settings may be expressed in any suitable alternative manner, e.g., for example by expressing brightness level settings using a scale of relative brightness steps between a lowest brightness level and a highest bright brightness level, by expressing PWM settings using a scale of relative PWM duty cycle settings between a lowest PWM signal duty cycle and a highest PWM signal duty cycle, etc.

Figure 3:
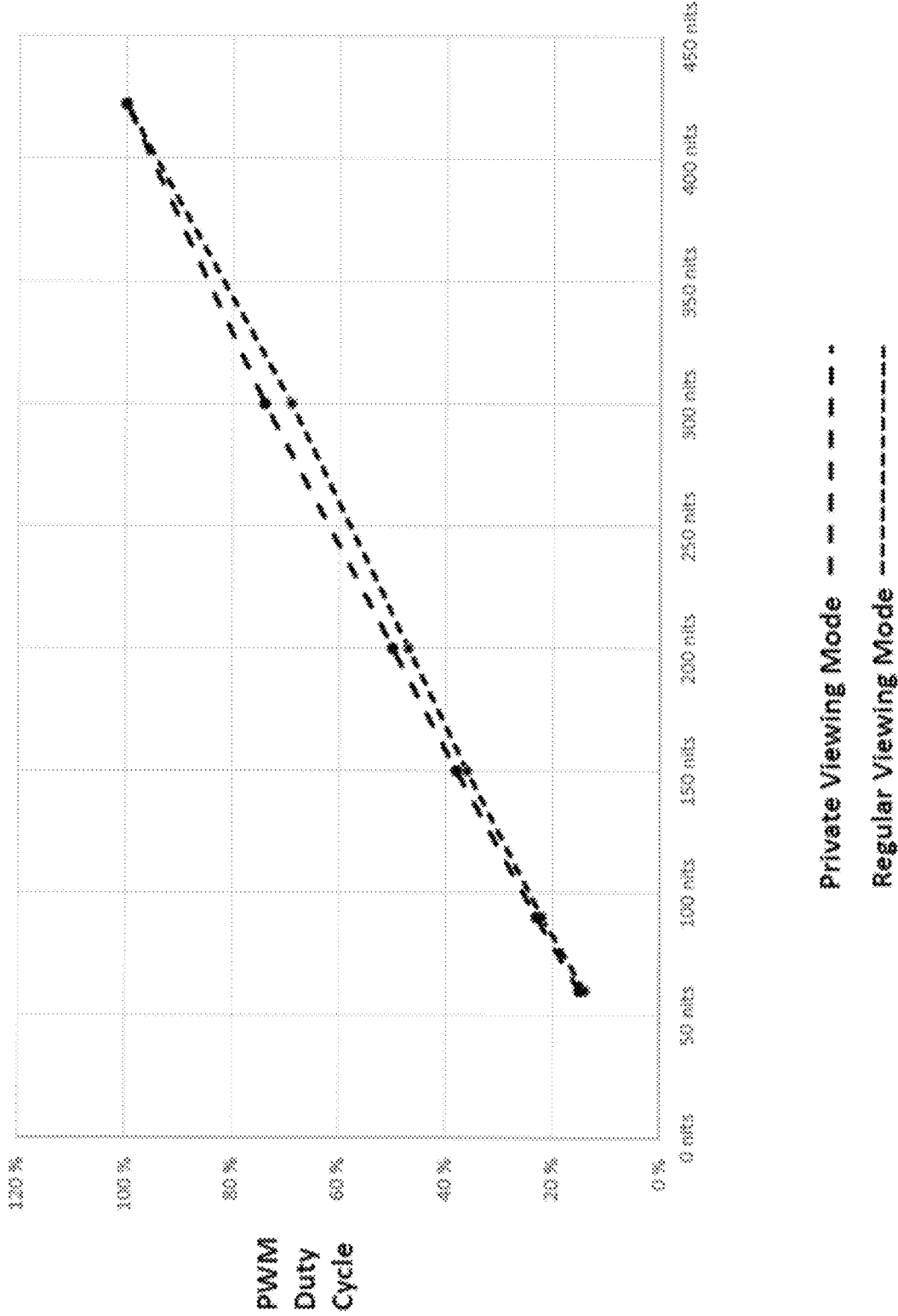
FIG. 3 illustrates brightness settings data in the form of PWM duty cycle percentage setting as a function of brightness level setting (nits) measured at the surface of the display panel according to one exemplary embodiment of the disclosed systems and methods.

In the embodiment of Table 1, the first column lists values of normal first brightness level setting that are used during normal (non-private) viewing mode, the second column lists corresponding normal PWM settings for the first brightness level of the first column setting for use during normal (non-private) viewing mode when the private viewing mode is disabled, and the third column lists corresponding compensated PWM settings for the second brightness level of the first column for automatic use (without any user brightness input control) during private viewing mode when the private viewing mode is enabled. For example, Table 1 below illustrates one exemplary embodiment of brightness settings 175 provided as a lookup table stored on NVM 107. FIG. 3 is a graphical representation of the PWM duty cycle percentage setting as a function of brightness level setting (nits) data of Table 1, which may be stored and utilized in one embodiment as brightness settings 175. In FIG. 3, brightness level setting (nits) data is displayed on the X-axis and corresponding PWM duty cycle percentage setting is displayed on the Y-axis.

TABLE 1

Brightness Settings

| Normal Display Panel Brightness Level Setting Measured at the Surface of the Display Panel (e.g., Manual User Setting for Normal Viewing Mode) | Normal PWM Duty Cycle Percentage Setting Value for First Brightness Level During Normal Viewing Mode | Compensated PWM Duty Cycle Percentage Setting Value for Second Brightness Level During Private Viewing Mode |
|---|---|---|
| 60 nits | 14% | 15% |
| 90 nits | 22% | 23% |
| 150 nits | 36% | 38% |
| 200 nits | 47% | 50% |
| 300 nits | 69% | 74% |
| 400 nits | 100% | 100% |

For example, returning to step 201, EC 103 may initially parse brightness level settings 175 to determine a PWM setting for use during normal (non-private) viewing mode of step 201 on display panel assembly 125 that corresponds to the current normal first brightness level setting (e.g., which may be manually entered by a user before or during step 201). For example, a normal PWM duty cycle setting of 47% may be selected from Table 1 or FIG. 3 to correspond to a current selected (or otherwise designated) normal first brightness level setting of 200 nits. EC 103 may then transmit ASL code as control data to graphics driver 129 on CPU 105 across eSPI and PCH 110 that corresponds to this determined 47% PWM duty cycle setting as Advanced Configuration and Power Interface (ACPI) ASL code.

Figure 4:
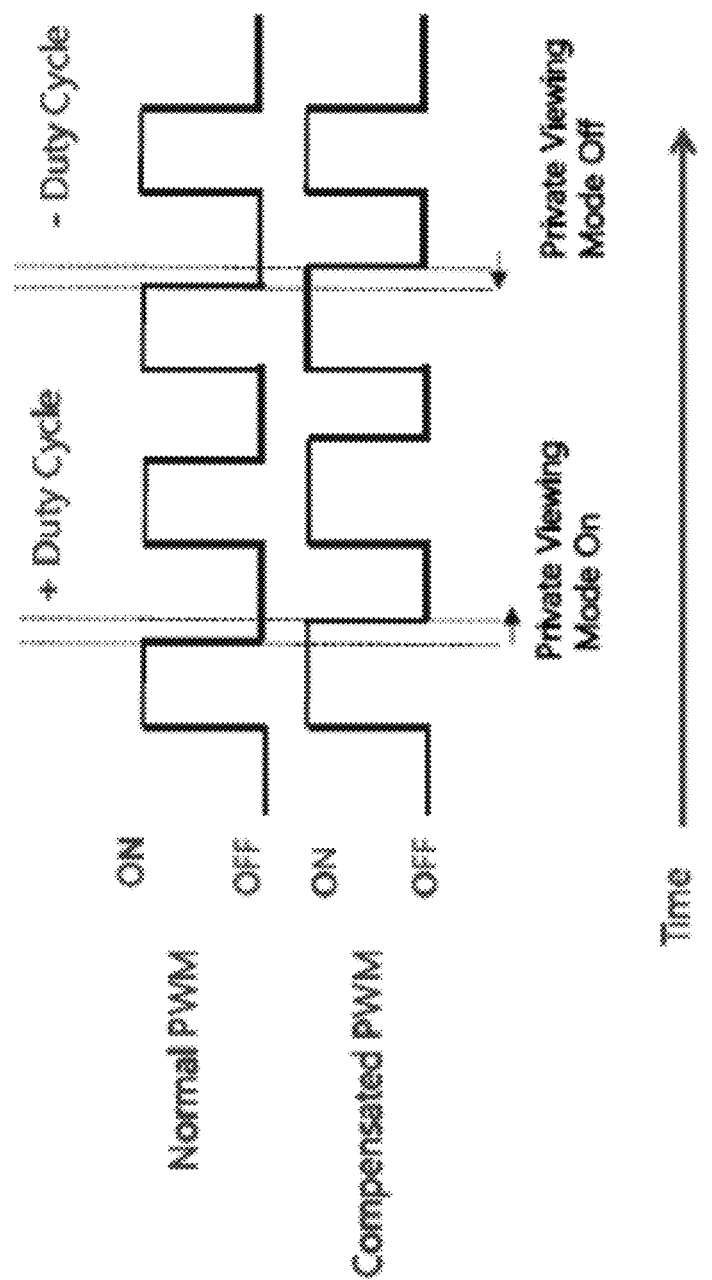
FIG. 4 illustrates normal and compensated PWM waveforms according to one exemplary embodiment of the disclosed systems and methods.

Still referring to step 201, graphics driver 129 on CPU 105 may then respond by setting the current duty cycle of the PWM control signal 168 to be a first duty cycle magnitude level that is 47% of the PWM duty cycle of the maximum brightness level (e.g., 422 nits) of display panel assembly 125, and provides this current PWM duty cycle to TCON 165. CPU 105 provides this first duty cycle magnitude level of PWM signal 168 in step 201 as the current PWM control signal for normal viewing mode to TCON 165. TCON 165 responds to this current PWM control signal by setting the current brightness level of backlights $131_1$ to $131_N$ to 47% of the maximum (100%) PWM duty cycle, or to yield a normal display panel brightness level of about 200 nits. The upper waveform of FIG. 4 illustrates an example of a normal duty cycle of a PWM signal versus time that may be provided from CPU 105 to TCON 165.

In step 208, EC 103 may again parse brightness level settings 175 to determine a compensated PWM setting that corresponds to the current normal first brightness level setting that is used to implement a second brightness level during private viewing mode on display panel assembly 125 (e.g., in response to a private viewing mode that has been implemented by a user press of designated private viewing key/s of keyboard 145). For example, a compensated PWM setting of 50% duty cycle may be automatically selected (without user control) from Table 1 to correspond to the same current normal first brightness level setting of 200 nits described in relation to FIG. 201. EC 103 may then automatically transmit ASL code as control data to CPU 105 across eSPI and PCH 111 that corresponds to this determined 50% compensated PWM duty cycle setting as Advanced Configuration and Power Interface (ACPI) ASL code to CPU 105.

Still referring to step 208, graphics driver 129 on CPU 105 may then respond by setting the current duty cycle of the PWM control signal to be a second duty cycle magnitude level of PWM signal 168 that is 50% of the PWM duty cycle of the maximum brightness level (e.g., 422 nits) of display panel assembly 125. CPU 105 provides this second duty cycle magnitude level of PWM signal 168 as the current PWM control signal to TCON 165. TCON 165 responds to this current PWM control signal by setting the current brightness level of backlight $131_1$ to 50% of the maximum (100%) PWM duty cycle so as to automatically yield a display panel brightness level of about 211 nits without any user brightness input control. The lower waveform of FIG. 4 illustrates an example of a PWM signal having a compensated PWM duty cycle versus time that may be provided from CPU 105 to TCON 165. As shown by the rightward shifted vertical line in FIG. 4, the lower PWM signal waveform has an increased "ON" time corresponding to the increased duty cycle determined for the private viewing mode in step 208. Methodology 200 may then proceed to step 210.

In step 210, filter brightness and control logic 185 executes on EC 103 to determine whether a command has been received to return to normal (non-private) viewing mode, e.g., from a user pressing designated normal viewing mode key/s on keyboard 145. If no normal viewing mode command has been received, system 100 continues operating in private viewing mode with display panel 126 illuminated at the second brightness level, in which case CPU 105 continues transmitting the second duty cycle magnitude level of PWM signal 168 and EC 103 continues transmitting the same GPIO signals 161 and 163 to cause only single backlight $131_1$ to be active and illuminated. Step 210 then iteratively repeats as shown until a normal viewing mode command is received.

When it is determined in step 210 that a normal (non-private) viewing mode command is received (e.g., as a keyboard command from a system user), then methodology 200 returns to step 201, where EC 103 may determine the normal PWM duty cycle setting corresponding to the first brightness level from brightness settings 175 on NVM 107, and automatically transmit control data corresponding to this determined PWM setting (without any user brightness input control) as Advanced Configuration and Power Interface (ACPI) ASL code via eSPI and PCH 110 to CPU 105. Graphics driver 129 on CPU 105 may respond to this received control data by transmitting a first duty cycle magnitude of PWM signal 168 to TCON 165 to cause the backlights $131_1$ to $131_N$ to be illuminated at the first brightness level (e.g., predefined default brightness level or brightness level based on a previous manual user selection), and EC 103 transmits GPIO signals 161 and 163 to cause all backlights 131$_1$ to 131$_N$ to be active and illuminated at the first brightness level set by the normal PWM duty cycle setting so provided from CPU 105. As shown by the leftward shifted vertical line in FIG. 4, the upper PWM signal waveform has decreased "ON" time corresponding to the decreased duty cycle determined for the normal viewing mode.

It will be understood that the particular normal PWM duty cycle setting values and compensated PWM duty cycle setting values of Table 1 and FIG. 3 are exemplary only, and that other normal PWM settings and compensated PWM setting values may be defined that correspond to different normal display panel brightness level settings (e.g., nits). In one embodiment, such compensated PWM setting values may be empirically determined for a given information handling system and/or display panel assembly, for example, by operating a display panel assembly with an electronically-activated privacy filter at different normal display panel brightness level settings (e.g., nits) in a laboratory or factory setting to determine compensated PWM setting values that provide best brightness consistency between private viewing mode and normal viewing mode at multiple different normal display panel brightness level settings (e.g., nits). In one embodiment, compensated PWM setting values may be defined as a function of brightness level settings, e.g., a polynomial function such as linear, quadratic, cubic, etc. or other type of defined function rather than a lookup table.

As previously described, other configurations of one or more programmable integrated circuits within an information handling system may be employed to implement compensated PWM settings for driving display panel backlights so as to compensate for changes in the display panel brightness that would otherwise occur due to switching between a private viewing mode and a non-private viewing mode. For example, in one possible embodiment, one or more features of the compensated PWM setting mechanism of filter and brightness control logic 185 may be directly included with or integrated into a TCON 165 or backlight module of a display panel assembly 125 which processes the compensated PWM at the display panel end. In another embodiment, one or more features of the compensated PWM setting mechanism of filter and brightness control logic 185 may be implemented by graphics driver 129 since the PWM is driven by PCH 110 and controlled by graphic driver 129. In such an embodiment, the graphics driver 129 may receive notice of switching between private viewing mode and non-private viewing mode from EC 103 (e.g., through a GPIO state change and/or by EC ASL code transmitted via eSPI and PCH 110), and then then adjust PWM duty cycle setting directly.

It will also be understood that methodology 200 of FIG. 2 is exemplary only, and that other combinations or additional and/or alternative steps may be employed that are suitable for increasing display panel brightness consistency when using an electronically-activated privacy filter of an information handling system to switch back and forth between a private viewing mode and a non-private viewing mode.

It will also be understood that one or more of the tasks, functions, or methodologies described herein (e.g., including those described herein for components 103, 105, 120, 121, 123, 165, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising using at least one programmable integrated circuit of an information handling system to:
change a number of active backlights currently illuminating a display panel of the information handling system by controlling multiple backlights of the information handling system to alternately illuminate a display panel of the information handling system with a first group of the multiple backlights in a first mode to display images to a user at a first viewing angle and to illuminate the display panel with a second and smaller group of the multiple backlights in a second mode to display images to the user at a second viewing angle, the first viewing angle being wider than the second viewing angle, and the second group of the multiple backlights being a portion of the first group of the multiple backlights that includes less than all of the backlights of the first group of the multiple backlights; and
then respond to the change in the number of active backlights currently illuminating the display panel of the information handling system by automatically varying a brightness intensity of the multiple backlights of the information handling system based on a difference between a first number of active backlights illuminating the display panel in the first mode and a second number of active backlights illuminating the display panel in the second mode by illuminating the display panel of the information handling system with a first backlight brightness intensity whenever the multiple backlights are operated in the first mode, and by illuminating the display panel of the information handling system with a second backlight brightness intensity whenever the multiple backlights are operated in the second mode, the second backlight brightness intensity being greater than the first backlight brightness intensity;
where each of the individual backlights of the second group of the multiple backlights is controlled to have a greater brightness intensity in the second mode than it has in the first mode.

2. The method of claim 1, where the illuminating the display panel of the information handling system with the second backlight brightness intensity when the second and smaller group of the multiple backlights are operated in the second mode at least partially compensates for a reduction in the display panel brightness that occurs in comparison to when the display panel of the information handling system is illuminated with the first backlight brightness intensity while the first group of the multiple backlights are operated in the first mode.

3. The method of claim 1, where the brightness of the display panel while illuminated with the second backlight brightness intensity during the second mode is equal to the brightness of the display panel while illuminated with the first backlight brightness intensity during the first mode.

4. The method of claim 1, where the using the at least one programmable integrated circuit of the information handling system to automatically vary the brightness intensity of the multiple backlights of the information handling system in response to changes between the first mode and the second mode is performed by the programmable integrated circuit without any user input to control backlight brightness intensity.

5. The method of claim 1, further comprising using the at least one programmable integrated circuit of the information handling system to:
receive a first user command while controlling the multiple backlights of the information handling system to illuminate the display panel of the information handling system with the first group of the multiple backlights in the first mode; and
then respond to the received first user command by illuminating the display panel with the second and smaller group of the multiple backlights in the second mode.

6. The method of claim 5, further comprising then using the at least one programmable integrated circuit of the information handling system to:
receive a second user command while controlling the multiple backlights of the information handling system to illuminate the display panel of the information handling system with the second and smaller group of the multiple backlights in the second mode; and
then respond to the received second user command by illuminating the display panel with the first group of the multiple backlights in the first mode.

7. The method of claim 1, further comprising first empirically determining a brightness level setting value corresponding to the second brightness intensity by operating the display panel in the second mode at multiple different brightness intensities in a laboratory or factory setting and storing the determined brightness level setting value corresponding to the second brightness intensity in a non-volatile memory of the information handling system; and then accessing the non-volatile memory of the information handling system to select the brightness level setting value corresponding to the second brightness intensity from among other empirically-determined brightness level setting values corresponding to other of the multiple different brightness intensities as being the brightness intensity that provides an optimum display panel brightness consistency between the first mode and the second mode.

8. A method, comprising using at least one programmable integrated circuit of an information handling system to:
control one or more backlights of the information handling system to alternately illuminate a display panel of the information handling system in a first mode to display images to a user at a first viewing angle and to illuminate the display panel in a second mode to display images to the user at a second viewing angle, the first viewing angle being wider than the second viewing angle; and
automatically vary a brightness intensity of the one or more of the backlights of the information handling system in response to changes between the first mode and the second mode by illuminating the display panel of the information handling system with a first backlight brightness intensity whenever the one or more backlights are operated in the first mode, and by illuminating the display panel of the information handling system with a second backlight brightness intensity whenever the one or more backlights are operated in the second mode, the second backlight brightness intensity being greater than the first backlight brightness intensity;
where the method further comprises using the at least one programmable integrated circuit of the information handling system to provide a pulse width modulation (PWM) control signal to control the brightness intensity of the one or more backlights; and where using the at least one programmable integrated circuit of the information handling system to automatically vary a brightness intensity of the one or more of the backlights of the information handling system in response to changes between the first mode and the second mode comprises providing a first pulse width modulation (PWM) control signal to control the one or more of the backlights to illuminate the display panel of the information handling system with the first backlight brightness intensity in the first mode, and providing a second pulse width modulation (PWM) control signal to control the one or more of the backlights to illuminate the display panel of the information handling system with the second backlight brightness intensity in the second mode.

9. The method of claim 8, where the first PWM control signal comprises a first PWM duty cycle value and where the second PWM control signal comprises a second PWM duty cycle value; and where the method further comprising using the at least one programmable integrated circuit to access brightness setting data stored on non-volatile memory of the information handling system to determine the first PWM duty cycle value and the second PWM duty cycle value.

10. The method of claim 9, where the brightness setting data stored on the non-volatile memory of the information handling system comprises a relationship of first and second PWM duty cycle values as a function of values of display panel brightness; and where the method further comprising using the at least one programmable integrated circuit to:

access the brightness setting data to determine the first PWM duty cycle value for a selected display panel brightness;

control the one or more backlights of the information handling system to illuminate the display panel of the information handling system in the first mode to display the images to the user on the display panel;

access the brightness setting data to determine the second PWM duty cycle value for the selected display panel brightness; and control the one or more backlights of the information handling system to illuminate the display panel of the information handling system in the second mode to display the images to the user.

11. The method of claim 8, where a brightness of the display panel while illuminated with the second backlight brightness intensity during the second mode is equal to the brightness of the display panel while illuminated with the first backlight brightness intensity during the first mode.

12. An information handling system, comprising:

a display panel producing images based on display data;

multiple backlights illuminating the display panel to display the produced images on a front side of the display panel;

at least one programmable integrated circuit coupled to the display panel and the multiple backlights, the at least one programmable integrated circuit being programmed to:

provide the display data to the display panel;

change a number of active backlights currently illuminating a display panel of the information handling system by controlling the multiple backlights to alternately illuminate the display panel of the information handling system with a first group of the multiple backlights in a first mode to display the images to a user at a first viewing angle and to illuminate the display panel with a second and smaller group of the multiple backlights in a second mode to display images to the user at a second viewing angle, the first viewing angle being wider than the second viewing angle, and the second group of the multiple backlights being a portion of the first group of the multiple backlights that includes less than all of the backlights of the first group of the multiple backlights; and then respond to the change in the number of active backlights currently illuminating the display panel of the information handling system by controlling the multiple backlights to automatically vary a brightness intensity of the multiple backlights of the information handling system based on a difference between a first number of active backlights illuminating the display panel in the first mode and a second number of active backlights illuminating the display panel in the second mode by illuminating the display panel of the information handling system with a first backlight brightness intensity whenever the multiple backlights are operated in the first mode, and by illuminating the display panel of the information handling system with a second backlight brightness intensity whenever the multiple backlights are operated in the second mode, the second backlight brightness intensity being greater than the first backlight brightness intensity;

where the at least one programmable integrated circuit is programmed to control each of the individual backlights of the second group of the multiple backlights to have a greater brightness intensity in the second mode than it has in the first mode.

13. The information handling system of claim 12, where the at least one programmable integrated circuit is programmed to illuminate the display panel with the second backlight brightness intensity when the second and smaller group of the multiple backlights are operated in the second mode to at least partially compensate for a reduction in the display panel brightness that occurs in comparison to when the display panel is illuminated with the first backlight brightness intensity while the first group of the multiple backlights are operated in the first mode.

14. The information handling system of claim 12, where at least one programmable integrated circuit is programmed to control the multiple backlights to automatically vary the brightness intensity of the multiple of the backlights so that the brightness of the display panel while illuminated with the second backlight brightness intensity during the second mode is equal to the brightness of the display panel while illuminated with the first backlight brightness intensity during the first mode.

15. The information handling system of claim 12, where the at least one programmable integrated circuit of the information handling system is programmed to automatically vary the brightness intensity of the multiple backlights of the information handling system in response to changes between the first mode and the second mode is performed without any user input to control backlight brightness intensity.

16. The information handling system of claim 12, where the at least one programmable integrated circuit is coupled to at least one user interface; and where the at least one programmable integrated circuit is programmed to:

receive a first user command through the user interface while controlling the multiple backlights of the information handling system to illuminate the display panel of the information handling system with the first group of the multiple backlights in the first mode; and then respond to the received first user command by illuminating the display panel with the second and smaller group of the multiple backlights in the second mode.

17. The information handling system of claim 16, where the at least one programmable integrated circuit is programmed to:

receive a second user command through the user interface while controlling the multiple backlights of the information handling system to illuminate the display panel of the information handling system with the second and smaller group of the multiple backlights in the second mode; and then respond to the received second user command by illuminating the display panel with the first group of the multiple backlights in the first mode.

18. The information handling system of claim 12, further comprising a non-volatile memory coupled to the at least one programmable integrated circuit; where a brightness level setting corresponding to the second brightness intensity is first empirically determined in a laboratory or factory setting to produce display panel brightness consistency between the first mode and the second mode; where the brightness level setting value corresponding to the second brightness intensity is stored in the non-volatile memory of the information handling system together with other empirically-determined brightness level setting values corresponding to other of multiple different brightness intensities; and where the at least one programmable integrated circuit is programmed to access the non-volatile memory of the information handling system to select the brightness level setting value corresponding to the second brightness intensity from among other brightness level setting values corresponding to the other of the multiple different brightness intensities as being a brightness intensity that provides an optimum display panel brightness consistency between the first mode and the second mode.

19. An information handling system, comprising:

a display panel producing images based on display data;

one or more backlights illuminating the display panel to display the produced images on a front side of the display panel;

at least one programmable integrated circuit coupled to the display panel and the one or more backlights, the at least one programmable integrated circuit being programmed to:

provide the display data to the display panel;

control the one or more backlights to alternately illuminate the display panel of the information handling system in a first mode to display the images to a user at a first viewing angle and to illuminate the display panel in a second mode to display images to the user at a second viewing angle, the first viewing angle being wider than the second viewing angle; and control the one or more backlights to automatically vary a brightness intensity of one or more of the backlights of the information handling system in response to changes between the first mode and the second mode by illuminating the display panel of the information handling system with a first backlight brightness intensity whenever the one or more backlights are operated in the first mode, and by illuminating the display panel of the information handling system with a second backlight brightness intensity whenever the one or more backlights are operated in the second mode, the second backlight brightness intensity being greater than the first backlight brightness intensity;

where the at least one programmable integrated circuit is programmed to provide a pulse width modulation (PWM) control signal to:

control the brightness intensity of the one or more backlights, and automatically vary a brightness intensity of the one or more of the backlights of the information handling system in response to changes between the first mode and the second mode by providing a first pulse width modulation (PWM) control signal to control the one or more of the backlights to illuminate the display panel of the information handling system with the first backlight brightness intensity in the first mode, and by providing a second pulse width modulation (PWM) control signal to control the one or more of the backlights to illuminate the display panel of the information handling system with the second backlight brightness intensity in the second mode.

20. The information handling system of claim 19, further comprising non-volatile memory coupled to the at least one programmable integrated circuit and storing brightness settings; where the first PWM control signal comprises a first PWM duty cycle value and where the second PWM control signal comprises a second PWM duty cycle value; and where the at least one programmable integrated circuit is programmed to access the brightness setting data stored on the non-volatile memory of the information handling system to determine the first PWM duty cycle value and the second PWM duty cycle value.

21. The information handling system of claim 20, where the brightness setting data stored on the non-volatile memory of the information handling system comprises a relationship of first and second PWM duty cycle values as a function of values of display panel brightness; and where the at least one programmable integrated circuit is programmed to:

access the brightness setting data to determine the first PWM duty cycle value for a selected display panel brightness;

control the one or more backlights of the information handling system to illuminate the display panel of the information handling system in the first mode to display the images to the user on the display panel;

access the brightness setting data to determine the second PWM duty cycle value for the selected display panel brightness; and control the one or more backlights of the information handling system to illuminate the display panel of the information handling system in the second mode to display the images to the user.

22. The information handling system of claim 19, where a brightness of the display panel while illuminated with the second backlight brightness intensity during the second mode is equal to the brightness of the display panel while illuminated with the first backlight brightness intensity during the first mode.

* * * * *